(12) United States Patent
Tsai

(10) Patent No.: US 11,054,669 B2
(45) Date of Patent: Jul. 6, 2021

(54) EYEGLASSES ASSEMBLY

(71) Applicant: Min-Ching Tsai, Tainan (TW)

(72) Inventor: Min-Ching Tsai, Tainan (TW)

( * ) Notice: Subject to any disclaimer, the term of this patent is extended or adjusted under 35 U.S.C. 154(b) by 199 days.

(21) Appl. No.: 16/529,906

(22) Filed: Aug. 2, 2019

(65) Prior Publication Data

US 2021/0033881 A1 Feb. 4, 2021

(51) Int. Cl.
*G02C 1/08* (2006.01)
*G02C 1/00* (2006.01)
*G02C 5/10* (2006.01)
*G02C 5/22* (2006.01)

(52) U.S. Cl.
CPC ............ *G02C 1/08* (2013.01); *G02C 1/10* (2013.01); *G02C 5/10* (2013.01); *G02C 5/22* (2013.01)

(58) Field of Classification Search
CPC ... G02C 1/10; G02C 5/10; G02C 5/22; G02C 2200/06; G02C 1/08
See application file for complete search history.

(56) References Cited

U.S. PATENT DOCUMENTS

| | | | | |
|---|---|---|---|---|
| 2017/0336649 | A1* | 11/2017 | Chen | G02C 1/08 |
| 2017/0357104 | A1* | 12/2017 | Chen | G02C 1/08 |
| 2019/0317336 | A1* | 10/2019 | Tsai | G02C 5/12 |

FOREIGN PATENT DOCUMENTS

| | | |
|---|---|---|
| TW | M449971 U | 4/2013 |
| TW | M498321 U | 4/2015 |
| TW | M544014 U | 6/2017 |
| TW | M550414 U | 10/2017 |
| TW | M551702 U | 11/2017 |

* cited by examiner

*Primary Examiner* — Cara E Rakowski
(74) *Attorney, Agent, or Firm* — Alan D. Kamrath; Karin L. Williams; Mayer & Williams PC

(57) ABSTRACT

An eyeglasses assembly includes two lenses, a frame, and two positioning blocks. The frame includes two frame portions. Each frame portion includes upper and lower portions spaced from each other by a notch. The upper portion includes an insertion hole. The lower portion includes an engaging groove aligned with the insertion hole. At least one engaging hole extends from an outer surface of the lower portion to the engaging groove in a thickness direction. Each positioning block is mounted in an associated insertion hole and an associated engaging groove. Each positioning block includes at least one assembling hole to be aligned with the at least one engaging hole. Each of a plurality of fasteners extends through the at least one assembling hole of an associated one of the two positioning blocks and the at least one engaging hole of the associated lower portion.

5 Claims, 5 Drawing Sheets

A - A

B - B

EYEGLASSES ASSEMBLY

BACKGROUND OF THE INVENTION

The present invention relates to an eyeglasses assembly and, more particularly, to an eyeglasses assembly having lens with improved assembling stability and having a more reliable structure.

Conventional eyeglasses include a frame and two lenses. The frame includes a frame portion for receiving the lenses. Specifically, the frame portion includes two annular receiving holes in left and right portions thereof, respectively. The frame can be stretched to allow subsequent insertion of the lenses into the receiving holes. This assembling method requires a larger force, which is inconvenient to assemble and has a poor assembling stability.

To improve the above situation, a notch is provided at an outer side of each receiving hole of the frame portion, and a screw is mounted in an area having the notch. Each notch is expanded to allow easy insertion of a lens into the associated receiving hole. Each screw is tightened to reduce the associated notch, such that the associated lens can securely couple with the associated receiving hole. The assembling stability is poor, because only one screw is used and is tightened in a single direction.

Eyeglasses of another structure include an upper frame and a lower frame detachably coupled to the upper frame by coupling or by fasteners. Receiving sockets are formed between the upper and lower frames. However, the detachable arrangement may cause complete separation of the upper and lower frames when the eyeglasses falls off or are subject to an external force, leading to disengagement of the lenses. Examples of this structure are disclosed in Taiwan Utility Patents M449971, M498321, M544014, M550414, and M551702.

BRIEF SUMMARY OF THE INVENTION

An objective of the present invention is to provide an eyeglasses assembly having lens with improved assembling stability and having a more reliable structure.

An eyeglasses assembly according to the present invention includes two lenses, a frame, and two positioning blocks. The frame includes two frame portions connected by a bridge. Each of the two frame portions includes a central portion having a receiving hole. Each of the two frame portions includes an outer side which has a notch and which is distant to the bridge. Each of the two frame portions includes an upper portion and a lower portion on top and bottom sides of the notch, respectively. The upper portion includes an outer face, an inner face, a top face, and a bottom face. An insertion hole extends downwards from the top face and includes an opening section at an upper end thereof. The opening section has a width larger than a width of a lower portion of the insertion hole, forming two pressing faces respectively at two sides of a lower end of the opening section. The lower portion includes an outer surface, an inner surface spaced from the outer surface in a thickness direction, a top surface, and a bottom surface. An engaging groove extends downwards from the top surface of the lower portion and is aligned with the insertion hole of the upper portion. At least one engaging hole extends from the outer surface to the engaging groove in the thickness direction. Each of the two positioning blocks is mounted in the insertion hole of an associated upper portion and the engaging groove of an associated lower portion. Each of the two positioning blocks includes a top end having a pressing portion corresponding to the two pressing faces of the associated upper portion and a lower end having at least one assembling hole corresponding to the at least one engaging hole of the associated lower portion. The bottom face of the associated upper portion is close to or abuts against the top surface of the associated lower portion when the at least one at least one assembling hole is aligned with the at least one engaging hole of the associated lower portion. The eyeglasses assembly further includes a plurality of fasteners. Each of the plurality of fasteners extends through the at least one assembling hole of an associated one of the two positioning blocks and the at least one engaging hole of the associated lower portion.

In an example, the eyeglasses assembly further includes two caps. Each of the two caps is mounted to cover the outer face of an associated upper portion and the outer surface of an associated lower portion of one of the two frame portions of the frame. A lower end of the inner surface of each lower portion has a coupling groove. The top end of each of the two positioning blocks is spaced from a top end of the insertion hole of the associated upper portion by a spacing. Each of the two caps includes an outer board, an upper board extending inwards from a top end of the outer board and configured to cover the top face of the associated top portion, and a lower board extending inwards from a lower end of the outer board and configured to cover the bottom surface of the associated lower portion. The upper board includes an upper coupler aligned with the opening section of the associated insertion hole and inserted into the associated spacing. The lower board includes a lower coupler coupled with an associated coupling groove.

In an example, the eyeglasses assembly further includes two temples and two pins. An upper recessed portion is formed at a portion of the inner face and a portion of the bottom face of each upper portion. Each upper portion includes an upper pivotal hole extending downwards from the top face to the upper recessed portion. A lower recessed portion is formed at a portion of the top surface and a portion of the inner surface of each lower portion and includes a lower pivotal hole aligned with the upper pivotal hole. Each of the two temples includes an end having a stub with a pivotal hole extending vertically. The stub of each of the two temples is mounted in the upper recessed portion of the associated upper portion and the lower recessed portion of the associated lower portion. Each of the two pins extends through the upper pivotal hole of an associated upper portion, the pivotal hole of an associated stub, and the lower pivotal hole of the associated lower portion.

In assembly, the upper portion and the lower portion are moved away from each other, and an associated lens is inserted into the associated receiving hole. An associated positioning block is inserted downwards into the associated insertion hole and the associated engaging groove. Each assembling hole is aligned with the associated engaging hole of the associated lower portion. The pressing portion presses against the pressing faces of the associated upper portion. Thus, the upper portion and the lower portion are moved towards each other to stably hold the lens. Each fastener extends through the associated assembling hole and the associated engaging hole in the thickness direction perpendicular to the insertion direction of the positioning block, thereby stably retaining the positioning block while assuring that the spacing between the upper and lower portions can stably hold the associated lens to the frame. Next, the stub of each temple is mounted into the upper recessed portion of the associated upper portion and the lower recessed portion of the associated lower portion. Each pin extends downwards through the associated upper pivotal hole, the pivotal hole of the associated stub, and the associated lower pivotal hole. Each pin extends in a direction perpendicular to the extending direction of the associated fastener and provides connection for the upper and lower portions. Thus, the upper and lower portions will not disengage from each other, providing better assembling stability.

The two caps can be mounted to the frame. The upper coupler of each cap is coupled with the spacing between the top end of the associated positioning block and the top end of the insertion hole of the associated upper portion. The outer board of each cap covers the associated fasteners and the spacing between the associated upper and lower portions to improve the overall sense of quality while preventing the associated fasteners from falling off, thereby improving the assembling stability.

The present invention will become clearer in light of the following detailed description of illustrative embodiments of this invention described in connection with the drawings.

DETAILED DESCRIPTION OF THE INVENTION

Figure 1:
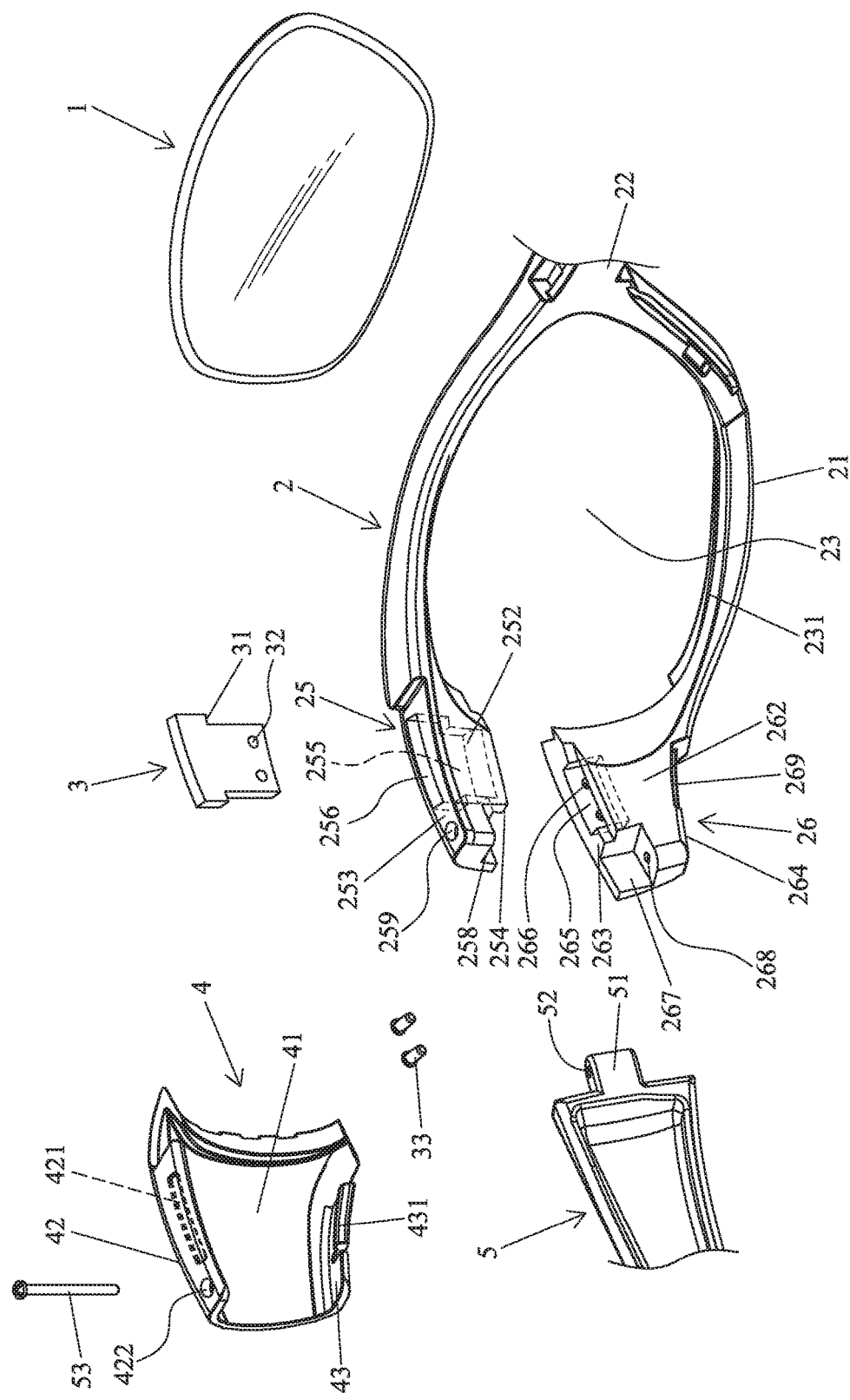
FIG. 1 is an exploded, perspective view of a portion of an eyeglasses assembly of an embodiment according to the present invention.
Figure 2:
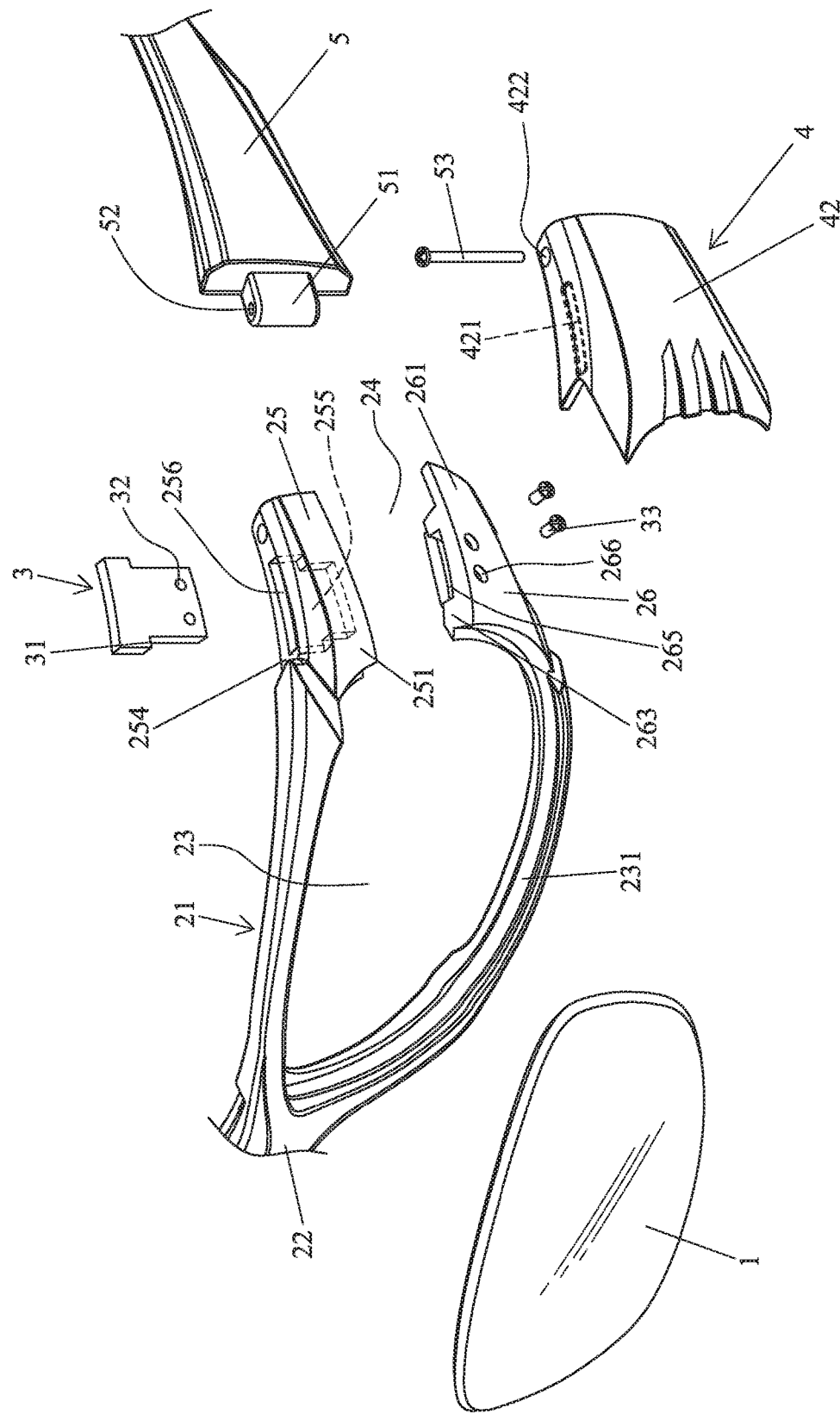
FIG. 2 is another exploded, perspective view of a portion of the eyeglasses assembly of FIG. 1.
Figure 3:
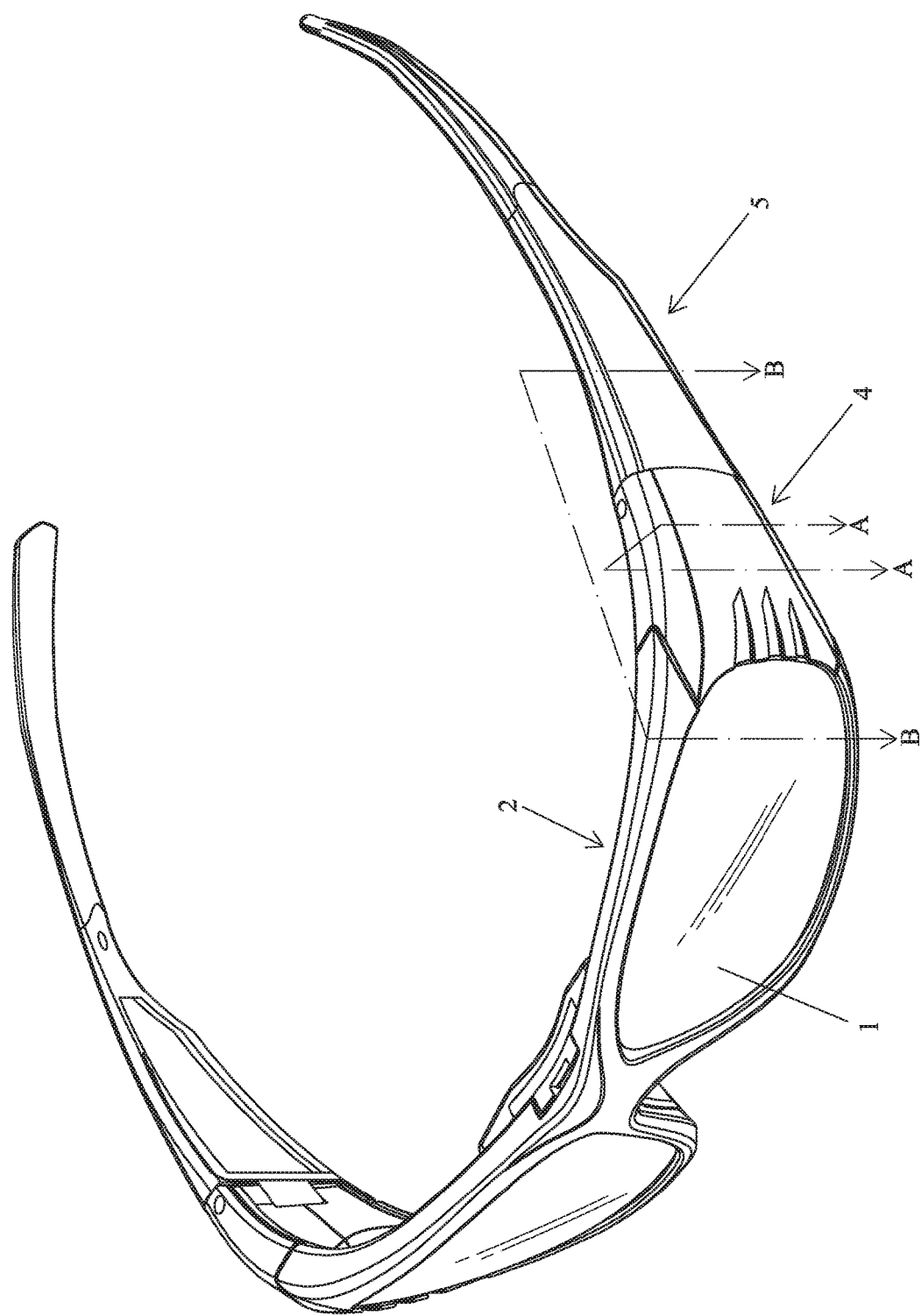
FIG. 3 is a perspective view of the eyeglasses assembly of FIG. 1.
Figure 4:
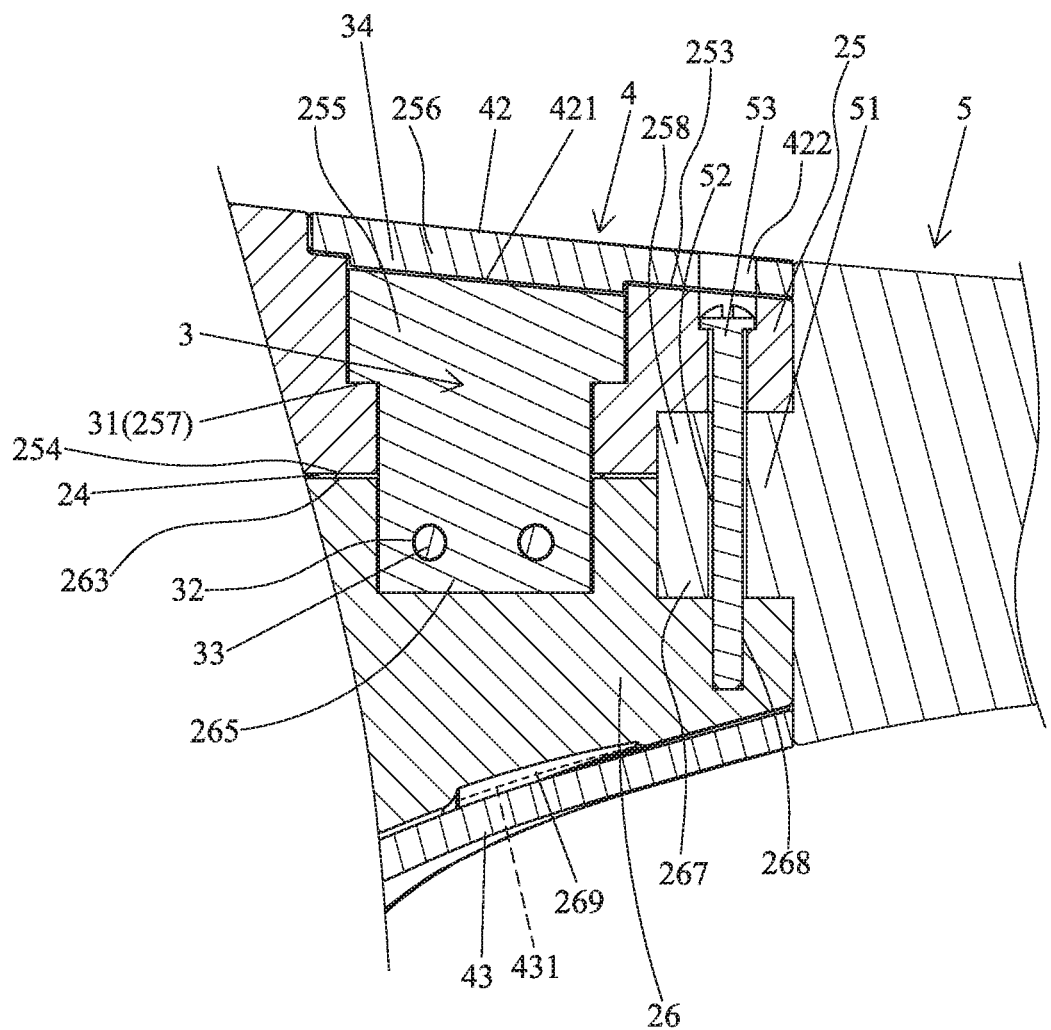
FIG. 4 is a cross sectional view taken along section line A-A of FIG. 3.
Figure 5:
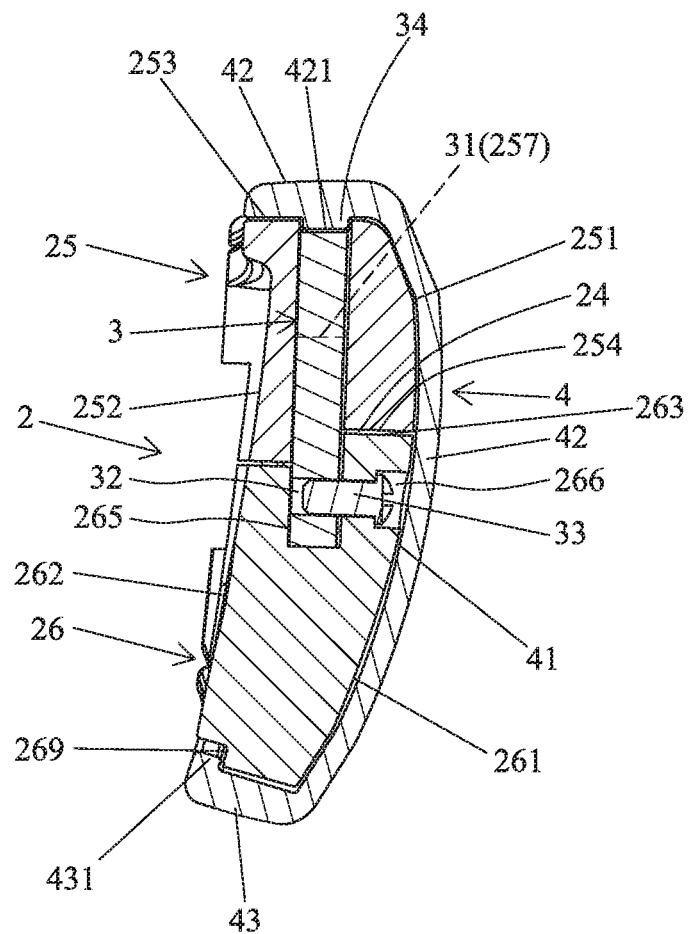
FIG. 5 is a cross sectional view taken along section line B-B of FIG. 3.

With reference to FIGS. 1-5, an eyeglasses assembly according to the present invention includes two lenses 1, a frame 2, two positioning blocks 3, two caps 4, and two temples 5. The two lenses 1 are made of a transparent material. A periphery of each of the two lenses can be coupled with an annular ring (not shown).

The frame 2 includes two frame portions 21 which are connected by a bridge 22 and which are symmetric to each other. Each of the two frame portions 21 includes a central portion having a receiving hole 23. An annular groove 231 is provided around each receiving hole 23 for coupling with an associated lens 1 or an annular ring (not shown). Each of the two frame portions 21 includes an outer side which has a notch 24 and which is distant to the bridge 22. Each of the two frame portions 21 includes an upper portion 25 and a lower portion 26 on top and bottom sides of the notch 24, respectively. The notch 24 between the upper portion 25 and the lower portion 26 can be increase to insert an associated lens 1 into an associated receiving hole 23. Then, the notch 24 can be reduced to securely retain the lens 1 in place.

Each upper portion 25 includes an outer face 251, an inner face 252, a top face 253, and a bottom face 254. An insertion hole 253 extends downwards from the top face 253 and includes an opening section 256 at an upper end thereof. The opening section 256 has a width larger than a width of a lower portion of the insertion hole 255, forming two pressing faces 257 (FIG. 4) respectively at two sides of a lower end of the opening section 256. An upper recessed portion 258 is formed at a portion of the inner face 252 and a portion of the bottom face 254 of each upper portion 25. Each upper portion 25 includes an upper pivotal hole 259 extending downwards from the top face 253 to the upper recessed portion 258.

Each lower portion 26 includes an outer surface 261, an inner surface 262 spaced from the outer surface 261 in a thickness direction, a top surface 263, and a bottom surface 264. An engaging groove 265 extends downwards from the top surface 263 and is aligned with the insertion hole 255 of an associated upper portion 25. At least one engaging hole 266 (two engaging holes 266 in this embodiment) extends from the outer surface 261 to the engaging groove 265 in the thickness direction. A lower recessed portion 267 is formed at a portion of the top surface 263 and a portion of the inner surface 262 of each lower portion 26 and includes a lower pivotal hole 268 aligned with the upper pivotal hole 259. A lower end of the inner surface 262 of each lower portion 26 has a coupling groove 269.

The two positioning blocks 3 can be made of plastic, metal, or other rigid material. Each of the two positioning blocks 3 is mounted in the insertion hole 255 of an associated upper portion 25 and the engaging groove 265 of an associated lower portion 26. Each of the two positioning blocks 3 includes a top end having a pressing portion 31 corresponding to the two pressing faces 257 of the associated upper portion 25 and a lower end having at least one assembling hole 32 (two assembling holes 32 in this embodiment) corresponding to the at least one engaging hole 266 of the associated lower portion 26. The bottom face 254 of the associated upper portion 25 is close to or abuts against the top surface 263 of the associated lower portion 26 when the at least one at least one assembling hole 32 is aligned with the at least one engaging hole 266 of the associated lower portion 26. The eyeglasses assembly further includes a plurality of fasteners 33. Each of the plurality of fasteners 33 extends through an associated assembling hole 32 of an associated one of the two positioning blocks 3 and an associated engaging hole 266 of the associated lower portion 26.

Each of the two caps 4 is mounted to cover the outer face 251 of the upper portion 25 and the outer surface 261 of the lower portion 26 of one of the two frame portions 21 of the frame 2. Each of the two caps 4 includes an outer board 41, an upper board 42 extending inwards from a top end of the outer board 41 and configured to cover the top face 253 of an associated top portion 25, and a lower board 43 extending inwards from a lower end of the outer board 41 and configured to cover the bottom surface 264 of an associated lower portion 26. The upper board 42 includes an upper coupler 421 aligned with the opening section 256 of the associated insertion hole 255 and inserted into the associated spacing 34. The upper board 42 includes a through-hole 422 aligned with an associated upper pivotal hole 259. The lower board 43 includes a lower coupler 431 for coupling with an associated coupling groove 269.

Each of the two temples 5 includes an end having a stub 51 with a pivotal hole 52 extending vertically. The stub 51 of each of the two temples 5 is mounted in the upper recessed portion 258 of an associated upper portion 25 and the lower recessed portion 267 of an associated lower portion 26. One of two pins 53 extends through the upper pivotal hole 259 of an associated upper portion 25, the pivotal hole 52 of an associated stub 51, and the lower pivotal hole 268 of an associated lower portion 26. Thus, each of the two temples 5 can pivot relative to the associated upper and lower portions 25 and 26.

In assembly, the upper portion 25 and the lower portion 26 are moved away from each other, and an associated lens 1 is inserted into the associated receiving hole 23. An associated positioning block 3 is inserted downwards into the associated insertion hole 255 and the associated engaging groove 265. Each assembling hole 32 is aligned with the associated engaging hole 266 of the associated lower portion 26. The pressing portion 31 presses against the pressing faces 257 of the associated upper portion 25. Thus, the upper portion 25 and the lower portion 26 are moved towards each other to stably hold the lens 1. Each fastener 33 extends through the associated assembling hole 32 and the associated engaging hole 266 in the thickness direction perpendicular to the insertion direction of the positioning block 3, thereby stably retaining the positioning block 3 while assuring that the spacing between the upper and lower portions 25 and 26 can stably hold the associated lens 1 to the frame 2.

Next, the stub 51 of each temple 5 is mounted into the upper recessed portion 258 of the associated upper portion 25 and the lower recessed portion 267 of the associated lower portion 26. Each pin 53 extends downwards through the associated upper pivotal hole 259, the pivotal hole 52 of the associated stub 51, and the associated lower pivotal hole 268. Each pin 53 extends in a direction perpendicular to the extending direction of the associated fastener 33 and provides connection for the upper and lower portions 25 and 26. Thus, the upper and lower portions 25 and 26 will not disengage from each other, providing better assembling stability.

Then, the two caps 4 are mounted to the frame 1. Specifically, the upper coupler 421 of each cap 4 is coupled with the spacing 34 between the top end of the associated positioning block 3 and the top end of the insertion hole 255 of the associated upper portion 25. The outer board 41 of each cap 4 covers the associated fasteners 33 and the spacing between the associated upper and lower portions 25 and 26 to improve the overall sense of quality while preventing the associated fasteners 33 from falling off, thereby improving the assembling stability.

In view of the foregoing, the positioning blocks 3 of the eyeglasses assembly according to the present invention provides improved assembling stability. The upper and lower portions 25 and 26 of the eyeglasses assembly according to the present invention can be coupled with a head strap rather than the temples 5. Furthermore, the insertion hole 255 of the upper portion 25 and the coupling groove 265 of the lower portion 26 can be exchanged, and the positioning blocks 3 can be mounted from below.

Although specific embodiments have been illustrated and described, numerous modifications and variations are still possible without departing from the scope of the invention. The scope of the invention is limited by the accompanying claims.

The invention claimed is:

1. An eyeglasses assembly comprising:
two lenses;
a frame including two frame portions connected by a bridge, wherein each of the two frame portions includes a central portion having a receiving hole, each of the two frame portions includes an outer side which has a notch and which is distant to the bridge, wherein each of the two frame portions includes an upper portion and a lower portion on top and bottom sides of the notch, respectively, wherein the upper portion includes an outer face, an inner face, a top face, and a bottom face, an insertion hole extends downwards from the top face and includes an opening section at an upper end thereof, wherein the opening section has a width larger than a width of a lower portion of the insertion hole, forming two pressing faces respectively at two sides of a lower end of the opening section, wherein the lower portion includes an outer surface, an inner surface spaced from the outer surface in a thickness direction, a top surface, and a bottom surface, wherein an engaging groove extends downwards from the top surface of the lower portion and is aligned with the insertion hole of the upper portion, wherein at least one engaging hole extends from the outer surface to the engaging groove in the thickness direction; and
two positioning blocks, wherein each of the two positioning blocks is mounted in the insertion hole of an associated upper portion and the engaging groove of an associated lower portion, wherein each of the two positioning blocks includes a top end having a pressing portion corresponding to the two pressing faces of the associated upper portion and a lower end having at least one assembling hole corresponding to the at least one engaging hole of the associated lower portion, wherein the bottom face of the associated upper portion is close to or abuts against the top surface of the associated lower portion when the at least one at least one assembling hole is aligned with the at least one engaging hole of the associated lower portion, wherein the eyeglasses assembly further includes a plurality of fasteners, wherein each of the plurality of fasteners extends through the at least one assembling hole of an associated one of the two positioning blocks and the at least one engaging hole of the associated lower portion.

2. The eyeglasses assembly as claimed in claim 1, further comprising two caps, wherein each of the two caps is mounted to cover the outer face of an associated upper portion and the outer surface of an associated lower portion of one of the two frame portions of the frame.

3. The eyeglasses assembly as claimed in claim 2, wherein a lower end of the inner surface of each lower portion has a coupling groove, wherein the top end of each of the two positioning blocks is spaced from a top end of the insertion hole of the associated upper portion by a spacing, wherein each of the two caps includes an outer board, an upper board extending inwards from a top end of the outer board and configured to cover the top face of the associated top portion, and a lower board extending inwards from a lower end of the outer board and configured to cover the bottom surface of the associated lower portion, wherein the upper board includes an upper coupler aligned with the opening section of the associated insertion hole and inserted into the associated spacing, and wherein the lower board includes a lower coupler coupled with an associated coupling groove.

4. The eyeglasses assembly as claimed in claim 1, further comprising two temples and two pins, wherein an upper recessed portion is formed at a portion of the inner face and a portion of the bottom face of each upper portion, wherein each upper portion includes an upper pivotal hole extending downwards from the top face to the upper recessed portion, wherein a lower recessed portion is formed at a portion of the top surface and a portion of the inner surface of each lower portion and includes a lower pivotal hole aligned with the upper pivotal hole, wherein each of the two temples includes an end having a stub with a pivotal hole extending vertically, wherein the stub of each of the two temples is mounted in the upper recessed portion of the associated upper portion and the lower recessed portion of the associated lower portion, and wherein each of the two pins extends through the upper pivotal hole of an associated upper portion, the pivotal hole of an associated stub, and the lower pivotal hole of the associated lower portion.

5. The eyeglasses assembly as claimed in claim 4, further comprising two caps, a lower end of the inner surface of each lower portion has a coupling groove, wherein the top end of each of the two positioning blocks is spaced from a top end of the insertion hole of the associated upper portion by a spacing, wherein each of the two caps 4 includes an outer board, an upper board extending inwards from a top end of the outer board and configured to cover the top face of the associated top portion, and a lower cap extending inwards from a lower end of the outer board and configured to cover the bottom surface of the associated lower portion, wherein the upper board includes an upper coupler aligned with the opening section of the associated insertion hole and inserted into the associated spacing, wherein the upper board includes a through-hole aligned with an associated upper pivotal hole, and wherein the lower board includes a lower coupler coupled with an associated coupling groove.

\* \* \* \* \*